(12) United States Patent
Yoshida

(10) Patent No.: US 6,312,126 B1
(45) Date of Patent: *Nov. 6, 2001

(54) EYEGLASSES HAVING RIMLESS SPECTACLE FRAME WITH ADJUSTABLE TEMPLES AND LENSES

(75) Inventor: Takehiko Yoshida, Higashiosaka (JP)

(73) Assignee: Vision Optic Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,553

(22) Filed: Oct. 5, 1999

(30) Foreign Application Priority Data

Apr. 28, 1999 (JP) .................................................. 11-121728

(51) Int. Cl.⁷ ........................................................ G02C 1/02
(52) U.S. Cl. ............................................. 351/110; 351/124
(58) Field of Search ...................................... 381/110, 141, 381/146, 145, 142, 124

(56) References Cited

U.S. PATENT DOCUMENTS 6,170,950 * 1/2001 Yoshida ................................. 351/110

* cited by examiner

Primary Examiner—Hung Xuan Dang
(74) Attorney, Agent, or Firm—Keating & Bennett, LLP

(57) ABSTRACT

A pair of eyeglasses includes a lens having through-holes near both edges thereof. A lug connected to a temple is installed at one end of the lens. A connection member having a lens-holding portion, a columnar member and a supporting piece is formed at one end of the lug. The outer diameter of the columnar member is substantially equal to the inner diameter of the through-hole of the lens, and the distance between the inner side of the supporting piece and the columnar member is substantially equal to the distance between the end of the lens and the through-hole. A flexible washer is interposed between the head part of the fastener and the lens. A connection member is disposed at an end of a bridge, which is installed at other end of the lens.

5 Claims, 9 Drawing Sheets

EYEGLASSES HAVING RIMLESS SPECTACLE FRAME WITH ADJUSTABLE TEMPLES AND LENSES

BACKGROUND OF THE INVENTION

1. Field of the Invention

The present invention relates to an apparatus for installing eyeglass lenses. More particularly, the present invention relates to an apparatus for installing eyeglass lenses for rimless eyeglasses mounted with a temple and a bridge.

2. Description of the Prior Art

FIG. 9 shows an example of a conventional eyeglass lens-mounting construction. A pair of eyeglasses 1 includes a lens 2 having a circular through-hole 3 formed near its edge. A temple 5 to be supported by the ear is installed on the lens 2 by means of a connection member 4. A male screw member 6 is provided on the connection member 4. The male screw member 6 is inserted into the through-hole 3 of the lens 2. A nut 7 is screwed on the male screw member 6 to fix the connection member 4 to the lens 2. A supporting piece 8 is provided on the connection member 4. The supporting piece 8 is disposed along the edge of the lens 2. The supporting piece 8 prevents the connection member 4 from rotating on the male screw member 6 and prevents the temple 5 from loosening. The connection member 4 is also formed on a bridge for connecting the two lenses 2 with each other to prevent the lenses 2 from loosening relative to each other.

Conventionally, a temple and a bridge are displayed in a display case or store window, with the temple and the bridge installed on a sample lens that is made of synthetic resin or the like. When a customer selects a temple and a bridge, a lens adjusted to the eyesight of the customer is molded into the same shape as that of the sample lens. Then, through-holes are formed in the lens. Then, a male screw part formed on a connection member of the temple is inserted into one of the through-holes, and a male screw part formed on a connection member of the bridge is inserted into the other through-hole. Then, the connection members are fixed with a nut.

A manufacturer installs the temple and the bridge on the sample lens such that the through-hole is formed at a correct position. That is, the distance between the edge of the sample lens and the through-hole is set to be equal to the distance between the inner side of the supporting piece and the male screw part. Thus, if the though-hole is formed at a position in the lens such that the position is coincident with the through-hole of the sample lens, the supporting piece can be positioned along the edge of the lens. The lens can then be installed securely on the temple and the bridge.

However, it is difficult to form the through-hole at a precise position of the lens such that its position is coincident with the through-hole of the sample lens, unless the through-hole forming task is carried out by a very skilled operator. For example, if the distance between the edge of the lens and the through-hole is too short, a gap is generated between the supporting piece of the connection member and the edge of the lens. As a result, the temple or other element is loosened. If the distance I between the edge of the lens and the through-hole is too long, the supporting piece of the connection member is misaligned relative to the edge of the lens. Consequently, the connection member cannot be installed on the lens. In the latter case, it is necessary to enlarge the through-hole toward the edge of the lens, causing the male screw part to be unstable inside the through-hole and thus, the connection member is loose.

SUMMARY OF THE INVENTION

Therefore, preferred embodiments of the present invention provide a method of installing an eyeglass lens in which a lens, a temple, as well as a bridge are not loosened relative to each other.

Preferred embodiments of the present invention also provide an apparatus and method for forming a through-hole on a lens at a correct position thereof (even if performed by an unskilled person) to achieve a desired eyeglass lens-installing construction.

In one preferred embodiment, there is provided an eyeglass lens-installing apparatus including a lens; a through-hole formed in the vicinity of an edge of the lens; a connection member having a columnar member inserted into the through-hole from a first surface side of the lens and a supporting piece arranged along the edge of the lens to connect the lens to a temple and a bridge; and a fastener inserted into the through-hole from a second surface side of the lens and fixed to the columnar member. In this construction, an inner diameter of the through-hole is substantially equal to an outer diameter of the columnar member and a distance between an inner side of the supporting piece and the columnar member is substantially equal to a distance between the edge of the lens and the through-hole.

In the eyeglass lens-installing apparatus, the fastener is preferably fixed to the columnar member by screwing a male screw part provided on the fastener into a female screw part provided on the columnar member.

It is preferable that the length of the columnar member is shorter than that of the through-hole; and a gap is preferably formed between the male part of the fastener and an inner wall of the through-hole.

It is also preferable that a flexible washer is interposed between the lens and a head part of the fastener.

Another preferred embodiment provides a method of forming a through-hole in a lens, the method being applied to an eyeglass lens-installing device. The method includes the steps of preparing a hole-forming apparatus having a cutting member for forming the through-hole in the lens; preparing a sample lens to be installed on a connection member having a columnar member to be inserted into the through-hole and a supporting piece to be formed along an edge of the lens and having a through-hole formed such that a distance between an inner side of the supporting piece and the columnar member is substantially equal to a distance between the edge of the sample lens and the through-hole; determining a position of the sample lens by fixing the sample lens such that the through-hole of the sample lens is located at a position corresponding to a position of the cutting member of the hole-forming apparatus; removing the sample lens from the hole-forming apparatus; fixing a lens at the determined position to form a through-hole thereon; and forming a through-hole in the lens using the cutting member.

In the hole-forming method, the step of determining a position of the sample lens preferably includes the steps of preparing a fixing rod including a shaft part having an outer diameter substantially equal to an inner diameter of the through-hole of the sample lens; inserting the shaft part of the fixing rod into the through-hole of the sample lens; fixing the fixing rod at a position corresponding to a position of the cutting member of the hole-forming apparatus; and fixing the sample lens.

The sample lens is preferably placed in a desired position via a plurality of movable supporting pins capable of fixing the sample lens, with the supporting pins in contact with a periphery of the sample lens. The sample lens is fixed in the desired position via the fixed supporting pins.

Further, a distance between an edge of the sample lens and the shaft part of the fixing rod is determined exactly by pressing a pressing plate against the edge of the sample lens when the fixing rod has been fixed. A distance between an edge of the lens and the through-hole is determined by pressing the edge of the lens against the pressing plate after the sample lens is removed from the hole-forming apparatus.

In another preferred embodiment, there is provided a hole-forming apparatus for forming a through-hole in a lens to be applied to an eyeglass lens-installing construction, including a lens-fixing tool for determining a position of a through-hole by fixing a sample lens having a through-hole formed at a predetermined position thereof; and a cutting member for forming a through-hole on the lens after the lens in which the through-hole is to be formed is fixed at the same position as that of a fixed position of the sample lens by means of the lens-fixing tool.

The hole-forming apparatus further includes a fixing concave part for fixing a fixing rod having a shaft part to be inserted into the through-hole of the sample lens. A position of the through-hole of the sample lens is determined by fixing the fixing rod to the fixing concave part, with the shaft part penetrating into the through-hole of the sample lens.

The hole-forming apparatus further includes a plurality of movable supporting pins for fixing the sample lens. A position of the sample lens is determined by fixing the supporting pins, with the supporting pins in contact with a periphery of the sample lens.

At least one of the supporting pins may be arranged to be movable after fixing the sample lens so as to be returned to the position in contact with a periphery of the sample lens.

The distance between the inner side of the supporting piece and the columnar member is substantially equal to the distance between the edge of the lens and the through-hole. Thus, the supporting piece can be positioned accurately along the edge of the lens. Further, the inner diameter of the through-hole is substantially equal to the outer diameter of the columnar member. Therefore, the columnar member can be prevented from loosening in the through-hole, and the position relationship between the connection member and the lens can be accurately determined as a result of the interaction between the columnar member and the supporting piece.

The lens can be installed on the connection member by screwing the male screw part provided on the fastener into the female screw part provided on the columnar member. The gap is formed between the male screw part and the inner wall of the through-holes. The gap absorbs any distortion generated on the lens, thus preventing the lens from being broken.

The flexible washer is preferably interposed between the fastener and the lens. Therefore, when the fastener is tightened, the washer is pressed into the gap formed between the male screw part and the inner wall of the through-holes, thus displaying its elastic force. Consequently, it is possible to prevent the fastener from loosening.

The sample lens having the through-hole formed at a correct position thereof is fixed. The through-hole of the sample lens is located at a position corresponding to the position of the cutting member of the hole-forming apparatus. A lens is located at the position where the sample lens has been placed. In this manner, it is possible to form a through-hole at the position of the lens, corresponding to the position of the through-hole of the sample lens by using the cutting member.

Using a fixing rod including a shaft part having an outer diameter that is substantially equal to the inner diameter of the through-hole of the sample lens, the shaft part is inserted into the through-hole of the sample lens. Then, the fixing rod is fixed at the position corresponding to the position of the cutting member of the hole-forming apparatus. In this manner, the position of the sample lens is determined.

At this time, a plurality of the movable supporting pins are moved to bring them into contact with the periphery of the sample lens. Then, the supporting pins are fixed, with the supporting pins in contact with the periphery of the sample lens. In this manner, the sample lens is placed in position.

The pressing plate is pressed against the edge of the sample lens. After the sample lens is removed from the hole-forming apparatus, the edge of the lens to be used practically is pressed against the pressing plate. In this manner, the distance between the edge of the lens and the through-hole can be determined.

To form a through-hole in a lens using a method according to preferred embodiments of the present invention, it is possible to use the hole-forming apparatus having the lens-fixing tool for fixing the sample lens having a through-hole formed at a predetermined position. It is possible to determine the position of the through-hole by using the lens-fixing tool. Thus, it is possible to form the through-hole at a correct position of the lens by using the cutting member for forming the through-hole in the lens after the lens on which the through-hole is to be formed is fixed at the same position as that of the fixed position of the sample lens by means of the lens-fixing tool.

In the hole-forming apparatus, the position of the through-hole of the sample lens can be determined by fixing the fixing rod to the fixing concave part provided on the hole-forming apparatus, with the shaft part of the fixing rod penetrating into the through-hole of the sample lens.

The position of the sample lens can be determined by fixing the movable supporting pins, with the supporting pins in contact with the periphery of the sample lens.

By arranging the supporting pin to be movable after fixing the sample lens so as to be returned to the position in contact with a periphery of the sample lens, it is easy to remove the sample lens, and to place the lens at the determined position.

The above and further features, aspects, and advantages of the present invention will be more fully apparent from the following detailed description with the accompanying drawings.

DETAILED DESCRIPTION OF PREFERRED EMBODIMENTS

Figure 1:
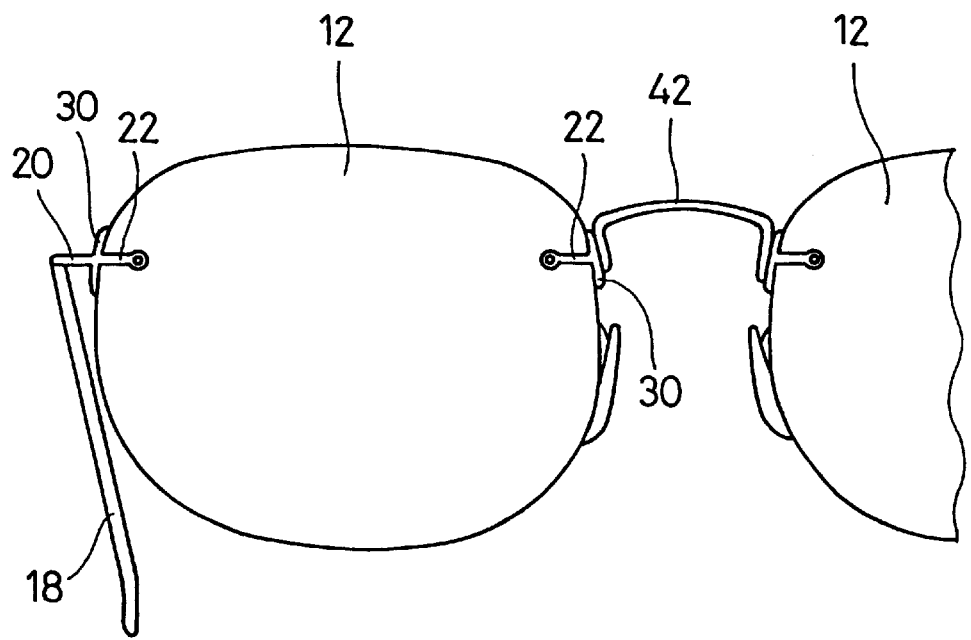
FIG. 1 shows a part of a pair of eyeglasses to which an eyeglass lens-installing apparatus of a preferred embodiment of the present invention is applied.
Figure 2:
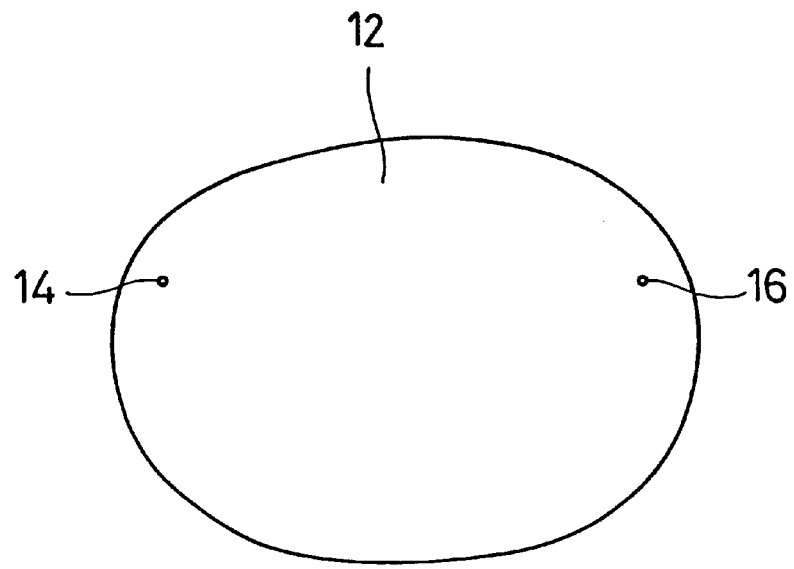
FIG. 2 shows a through-hole formed in a lens of the eyeglasses shown in FIG. 1.
Figure 3:
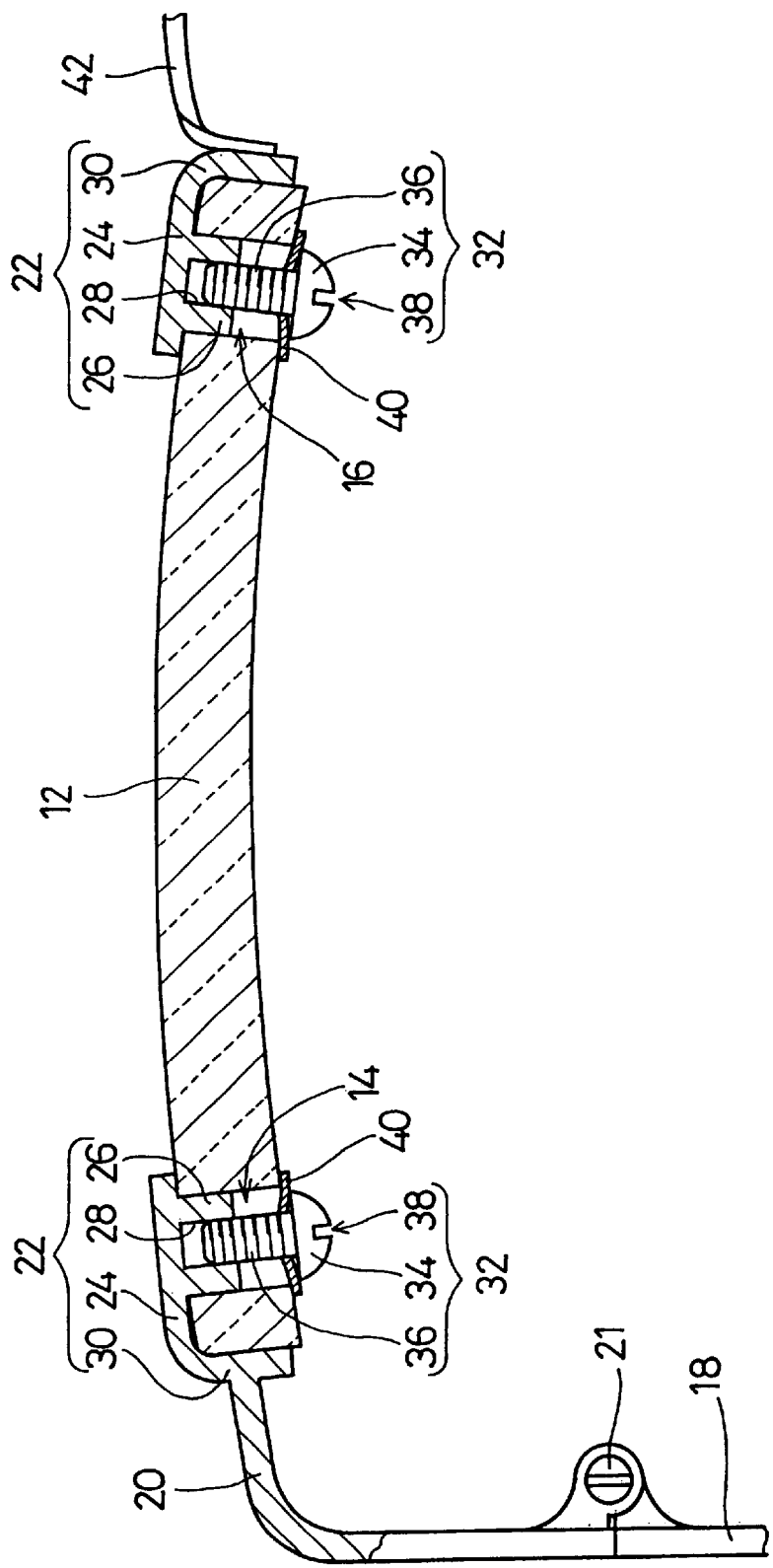
FIG. 3 is a sectional view showing the eyeglasses shown in FIG. 1.

FIG. 1 shows a part of a pair of eyeglasses to which the present invention is applied. The eyeglasses 10 include a lens 12. In this preferred embodiment, a plastic lens is preferably used as the lens 12. As shown in FIG. 2, circular through-holes 14,16 are formed in the lens 12 such that one of them is positioned in the vicinity of a first end of the lens 12 and the other is positioned in the vicinity of a second end thereof. As shown in FIG. 3, an L-shaped lug 20 is connected with a temple 18, which is supported by the ear and is installed at the first end of the lens 12. The lug 20 and the temple 18 are rotatably connected with each other through a hinge portion 21.

A connection member 22 is formed at a first end of the lug 20. The connection member 22 includes a lens-holding part 24 formed along one surface of the lens 12. The connection member 22 includes a columnar member 26 positioned at one end of the holding part 24. The columnar member 26 is substantially perpendicular to the holding part 24. The outer diameter of the columnar member 26 is set substantially equally to the inner diameter of the through-hole 14 of the lens 12. A female screw part 28 is formed on the inner surface of the columnar member 26 such that the female screw part 28 extends from the side corresponding to a second surface of the lens 12 toward a first surface thereof. The length of the columnar member 26 is preferably shorter than that of the through-hole 14. The connection member 22 includes a supporting piece 30 spaced at a predetermined interval from the columnar member 26. The supporting piece 30 is substantially perpendicular to the holding part 24. The columnar member 26 and the supporting piece 30 are opposed to each other, with one end part of the lens 12 sandwiched between the columnar member 26 and the supporting piece 30. The supporting piece 30 is installed at the first end of the lug 20. The supporting piece 30 is formed at both sides of the lug 20 such that the supporting piece 30 extends along the periphery of the first end of the lens 12.

The columnar member 26 of the connection member 22 is inserted into the through-hole 14 from a first surface side of the lens 12. The length of the columnar member 26 is preferably shorter than that of the through-hole 14, as described above. Thus, the leading end of the columnar member 26 is located inside of the through-hole 14. That is, the leading end of the columnar member 26 does not project from the other surface of the lens 12. The supporting piece 30 is disposed along the first end of the lens 12, with the columnar member 26 and the supporting piece 30 opposed to each other. The distance between the inner side of the supporting piece 30 and the columnar member 26 is preferably substantially equal to the distance between the first end of the lens 12 and the through-hole 14. Thus, the first end part of the lens 12 is sandwiched between the columnar member 26 and the supporting piece 30. Because the outer diameter of the columnar member 26 is substantially equal to the inner diameter of the through-hole 14 of the lens 12, the first end part of the lens 12 is tightly fitted into the connection member 22.

A fastener 32 is inserted into the through-hole 14 from a second surface side of the lens 12. The fastener 32 includes a head part 34 and a male screw part 36 extending from the head part 34. A groove 38 for rotating the fastener 32 with a driver is formed on the head part 34. The male screw part 36 of the fastener 32 is inserted into the through-hole 14 from the second surface side of the lens 12 to screw the male screw part 36 on the female screw part 28 of the columnar member 26. At this time, a flexible washer 40 made of synthetic resin or other suitable material is interposed between the head part 34 of the fastener 32 and the lens 12. The temple 18 is installed on the lens 12 via the connection member 22 and the fastener 32. The outer diameter of the male screw part 36 is preferably slightly smaller than the inner diameter of the through-hole 14. Thus, a gap is formed between the male screw part 36 and the inner wall of the through-hole 14.

One end of a bridge 42 is installed at the second end of the lens 12. The connection member 22 including the holding part 24, the columnar member 26, and the supporting piece 30 is disposed at both ends of the bridge 42 and at the first end of the lug 20 installed at the first end of the lens 12. The columnar member 26 of the connection member 22 is inserted into a through-hole 16 from the first surface side of the lens 12. The fastener 32 is inserted into the through-hole 16 from a second surface side of the lens 12, with the washer 40 interposed between the lens 12 and the fastener 32 to screw the male screw part 36 of the fastener 32 on the female screw part 28 of the columnar member 26. Consequently, the first end of the bridge 42 is installed at the second end of the lens 12. The second end of the bridge 42 is installed on another lens 12. The temple 18 is installed on another lens 12. The connection member 22, the fastener 32, and the washer 40 are used to install the temple 18 and the bridge 42 on another lens 12.

Figure 4:
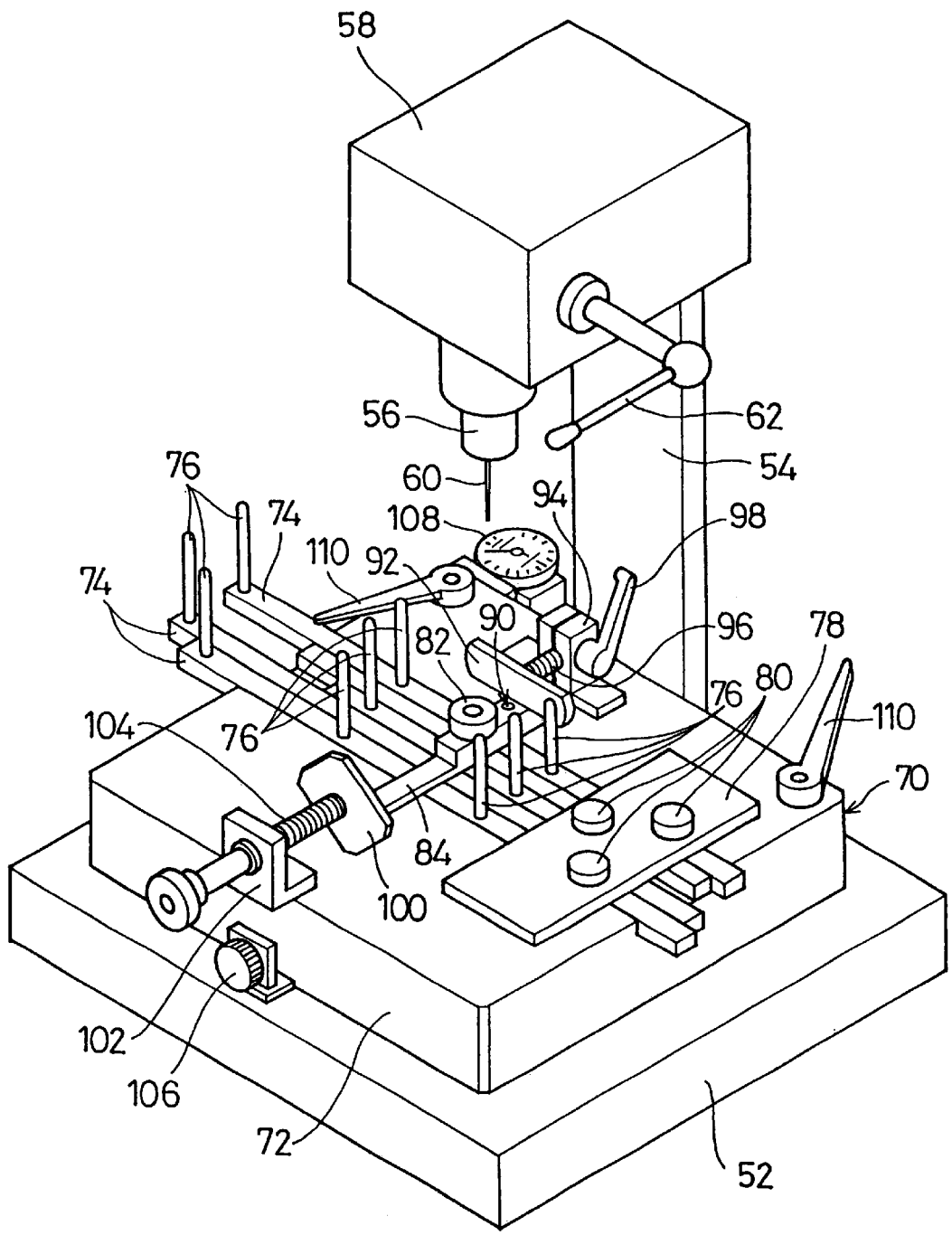
FIG. 4 is a perspective view showing a hole-forming apparatus for forming a through-hole in the lens for use in the eyeglasses shown in FIG. 1.

FIG. 4 is a perspective view showing a hole-forming apparatus 50 for forming the through-holes 14, 16 in the lens 12. The hole-forming apparatus 50 includes a table 52. A square pillar-shaped column 54 extends upward from an end of the table 52. A spindle head 58 holding a main shaft 56 rotatably thereon is formed at the upper end of the column 54. A drill 60 serving as a cutting member is installed on the main shaft 56. A lever 62 is rotatably installed on the spindle head 58. The main shaft 56 can be vertically moved by rotating the lever 62. Thus, the drill 60 can be applied to a workpiece placed on the table 52 to form a hole therein by operating the lever 62.

A lens-fixing tool 70 is installed on the table 52. The lens-fixing tool 70 includes a base 72. A plurality of slide members 74 are installed on the base 72 such that they are preferably positioned substantially in parallel with one another. A supporting pin 76 is installed on each of the slide members 74 such that each supporting pin 76 extends upward from the slide members 74. A hold-down plate 78 for holding down the slide members 74 is installed thereon. Locking screws 80 are installed on the hold-down plate 78 at positions corresponding to the slide members 74. The locking screws 80 are pressed against the slide members 74 by screwing the locking screws 80 into the hold-down plate 78 to lock the movement of the slide member 74.

A lens-placing base 82 made of synthetic resin or the like is installed over the slide member 74. The lens-placing base 82 is provided on a base member 84 spanned over the slide members 74. The lens-placing base 82 is preferably substantially circular and has a circular concave part formed at the center thereof substantially corresponding to a curved surface of the lens 12 placed thereon. That is, the convex side of the curved lens 12 can be supported by the peripheral part of the lens-placing base 82, which means that the lens 12 contacts the lens-placing base 82 not at one point thereof. Thus, the lens 12 can be prevented from being damaged by the lens-placing base 82.

A fixing concave part 90 is provided on the base member 84 such that the fixing concave part 90 is located near the lens-placing base 82. The position of the fixing concave part 90 is aligned with the position of the drill 60. A pressing plate 92 is provided near the fixing concave part 90. The pressing plate 92 is formed at an end of a shaft extending from a shaft-supporting block 94. A spring 96 is provided between the pressing plate 92 and the shaft-supporting block 94. The spring 96 presses the pressing plate 92 toward the lens-placing base 82. A fixing lever 98 is installed on the shaft-supporting block 94. The fixing lever 98 is operated to fix the pressing plate 92 at a desired position by making the shaft supporting the pressing plate 92 stationary.

An auxiliary pressing plate 100 is provided and spaced at a predetermined distance from the pressing plate 92. The auxiliary pressing plate 100 is installed at an end of a male screw rod 104 extending inward from a shaft-supporting block 102. The position of the auxiliary pressing plate 100 can be adjusted by rotating the male screw rod 104. An adjusting knob 106 for moving the base 72 with respect to the table 52 is provided on a side surface of the base 72. A fine adjustment of the position of the base 72 can be accomplished by rotating the adjusting knob 106. A meter 108 indicating a movement distance of the base 72 is provided. The meter 108 indicates a slight movement distance of the base 72. Two fixing levers 110 installed on the base 72 are used to fix the base 72 at a desired position.

In making eyeglasses 10, a lens is selected according to the eyesight of a customer, the lens is molded into a predetermined shape, and then, the temple 18 and the bridge 42 are installed on the lens 12. Normally, the temple 18 and the bridge 42 are displayed in a display case or store window, with the temple 18 and the bridge 42 installed on a sample lens made of synthetic resin or other suitable material. In manufacturing, a through-hole is formed at a correct position in the sample lens, according to the shape and size of the temple 18 and the bridge 42. Thus, if a through-hole can be formed at a position of a lens to be practically used such that the position is coincident with the position of the through-hole of the sample lens, it is possible to allow the distance between one end of the lens and the through-hole to be substantially equal to the distance between the inner side of the supporting piece 30 and the columnar member 26.

Figure 5:
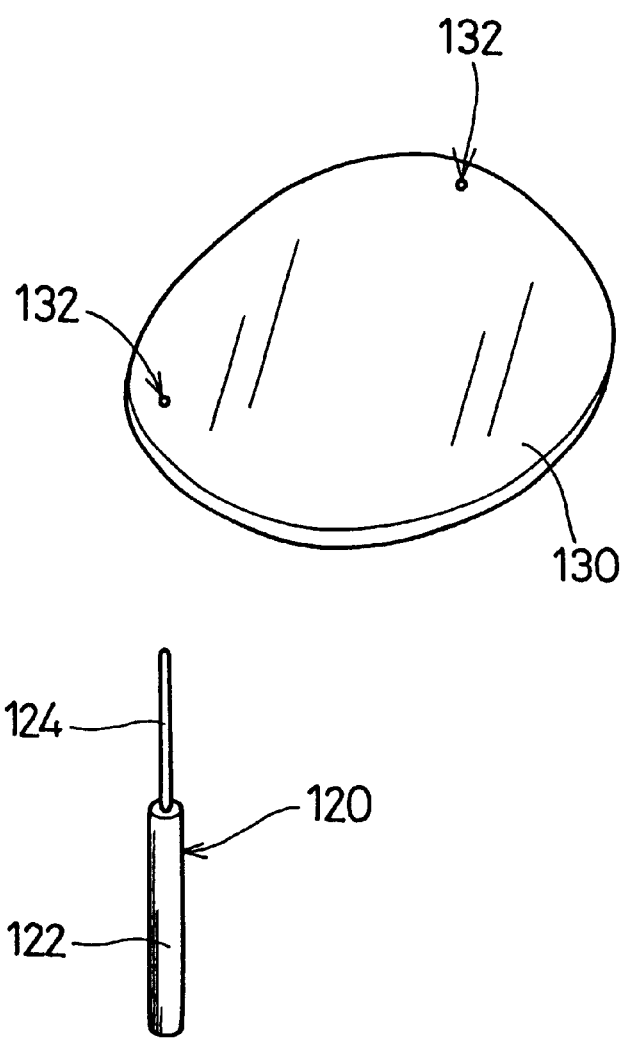
FIG. 5 shows a sample lens and a fixing rod that are used to place the lens in position with the hole-forming apparatus shown in FIG. 4.

The hole-forming apparatus 50 is used to form the through-holes 14, 16 at correct positions in the lens 12. In this case, as shown in FIG. 5, a fixing rod 120 is prepared. The fixing rod 120 includes a substantially circular fixing part 122 and a narrow shaft part 124 formed at an end of the fixing part 122. A plurality of different size shaft parts 124 are prepared in correspondence to different inner diameter through-holes to be formed in the lens 12. The shaft part 124 of the fixing rod 120 is inserted into a through-hole 132 of a sample lens 130. In the case where the sample lens 130 is curved, the shaft part 124 of the fixing rod 120 is inserted into the through-hole 132 from the convex side thereof.

Figure 6:
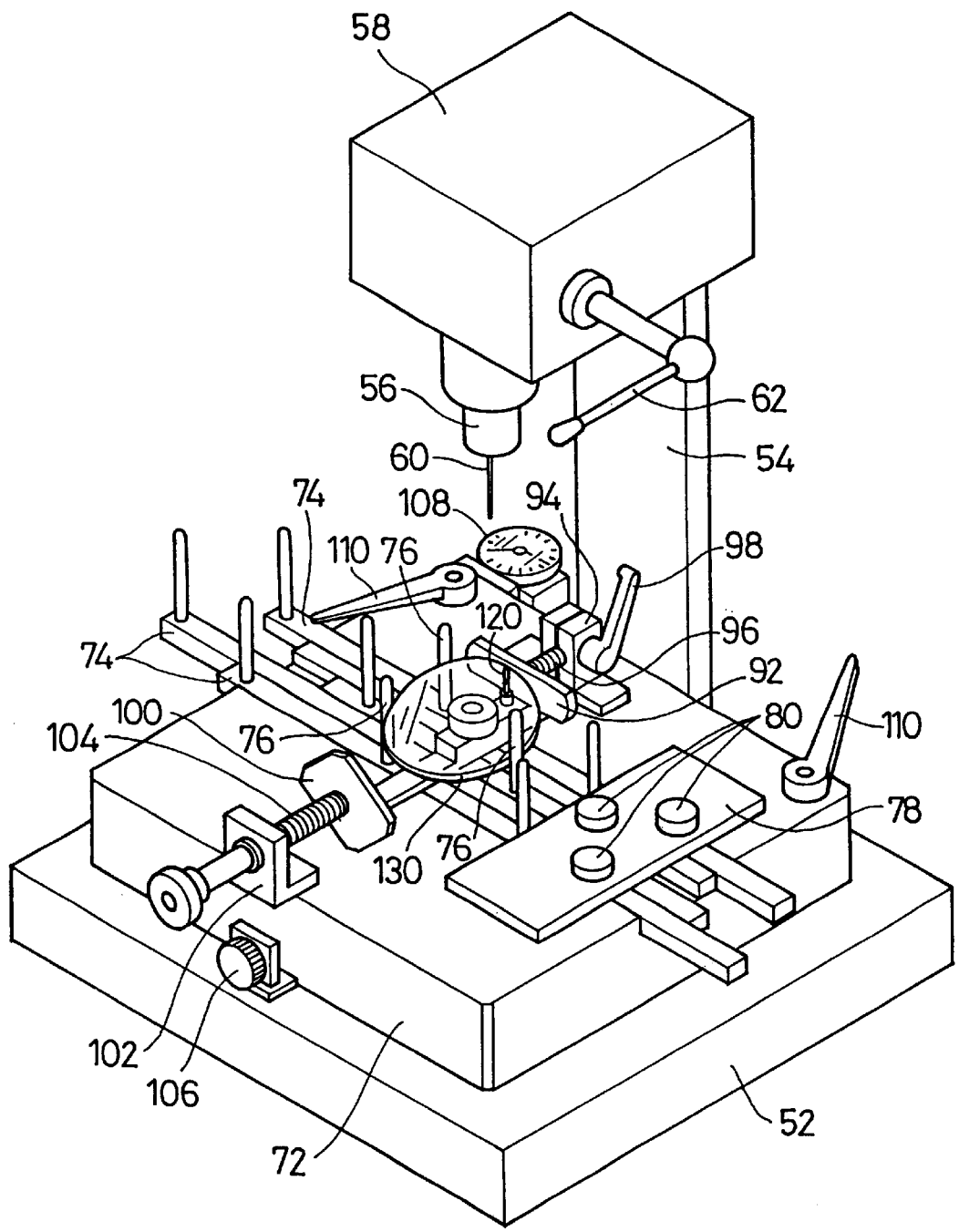
FIG. 6 is a perspective view showing the state in which the sample lens and the fixing rod are installed on the hole-forming apparatus shown in FIG. 4.

As shown in FIG. 6, the fixing rod 120 inserted into the through-hole 132 of the sample lens 130 is fixed to the hole-forming apparatus 50. More specifically, the fixing part 122 of the fixing rod 120 is inserted into the fixing concave part 90 formed on the base member 84. The pressing plate 92 is applied to one end of the sample lens 130. The slide member 74 is moved to bring the supporting pin 76 into contact with the edge of the sample lens 130. In this state, the pressing plate 92 and the slide member 74 are fixed at desired positions, respectively. Accordingly, the position of the sample lens 130 is determined, and that of the through-hole 132 formed in the sample lens 130 are determined. The fixing concave part 90 formed on the base member 84 corresponds to the position of the drill 60. Therefore, the fixing rod 120 fixed to the fixing concave part 90 allows the through-hole 132 of the sample lens 130 to be located at the position corresponding to the drill 60.

Figure 7:
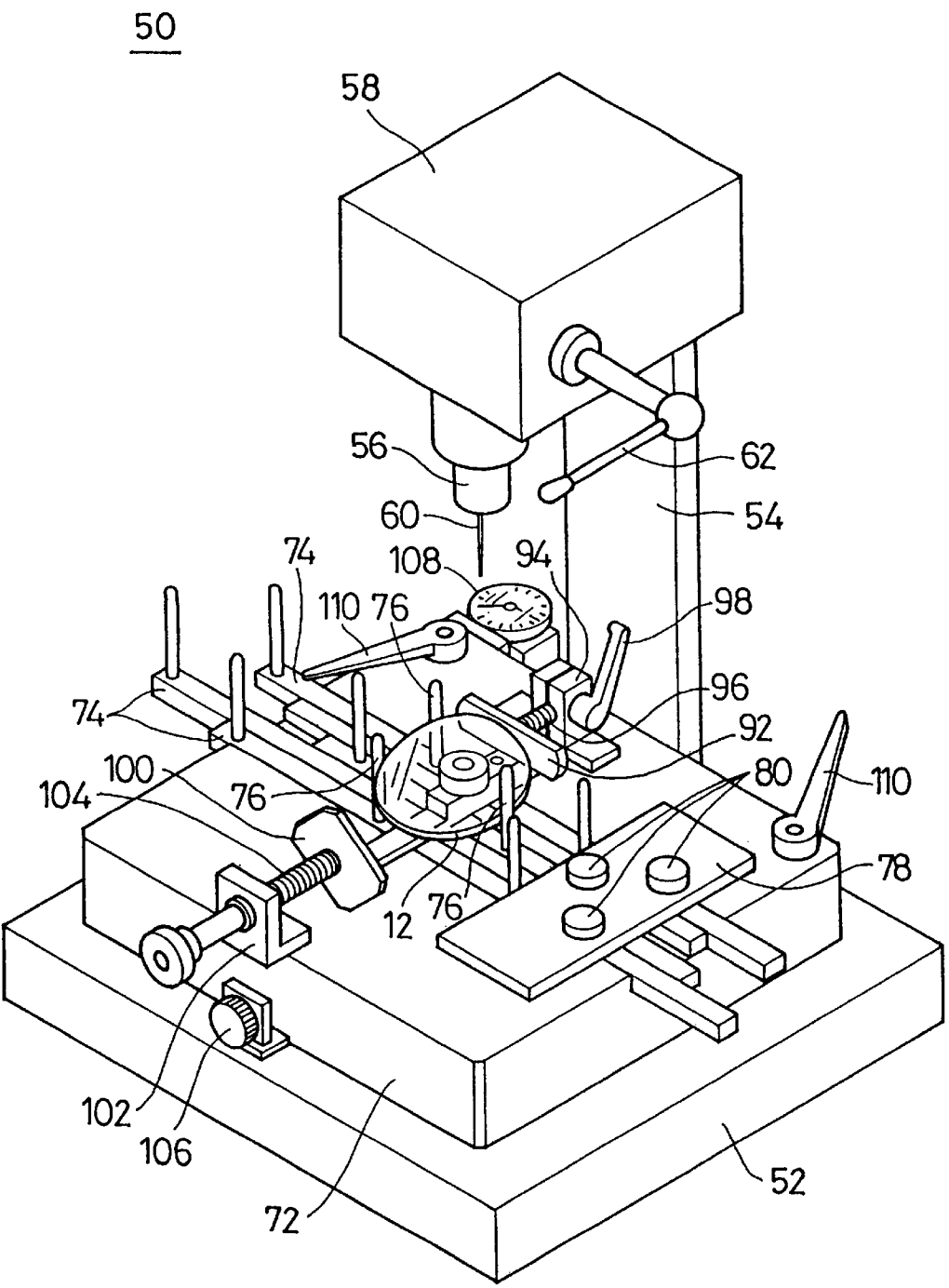
FIG. 7 is a perspective view showing the state in which a lens to be used practically is installed on the hole-forming apparatus shown in FIG. 4.

After the position of the sample lens 130 is determined, the sample lens 130 and the fixing rod 120 are removed from the hole-forming apparatus 50. Then, as shown in FIG. 7, the lens 12 to be used practically is placed at the position where the sample lens 130 has been placed. Because the shape of the lens 12 is identical to that of the sample lens 130, the position of the lens 12 is determined with the supporting pin 76 and the pressing plate 92. The drill 60 is applied to the lens 12 while the drill 60 is being rotated. As a result, the through-hole 14 is formed in the lens 12 at a position corresponding to the position of the through-hole 132 of the sample lens 130. When the curved lens 12 is placed on the lens-placing base 82, an inclination thereof can be corrected by pressing the end part thereof before the drill 60 is applied to the lens 12. Accordingly, the drill 60 can be applied to the lens 12 at an angle substantially perpendicular to the surface thereof. That is, the through-hole 14 can be formed at a correct position thereof.

It is possible to form the through-hole 16 at a correct position of the lens 12 in correspondence to the position of the through-hole 132 formed on the sample lens 130. The auxiliary pressing plate 100 is used as necessary. That is, if the position of the lens 12 can be determined with the pressing plate 92 and the supporting pin 76, the use of the auxiliary pressing plate 100 can be eliminated.

The curvature of the lens 12 is different according to the diopter thereof. Thus, if the curvature of the lens 12 to be used practically is different from that of the sample lens 130, the angle of the holding part 24 of the connection member 22 is adjusted. In this case, when the angle of the holding part 24 is adjusted, the position of the columnar member 26 with respect to the supporting piece 30 is changed by a slight degree. Thus, it is necessary to finely adjust the position of the through-holes 14, 16 to be formed in the lens 12. In this case, while an operator is watching the meter 108, the position of the base 72 is adjusted finely by operating the adjusting knob 106 to adjust the position of the fixing concave part 90 in correspondence to the position of the drill 60. As an adjusting method, it is possible to use a method of adjusting the movement distance of the base 72 according to a diopter of the lens 12.

Figure 8:
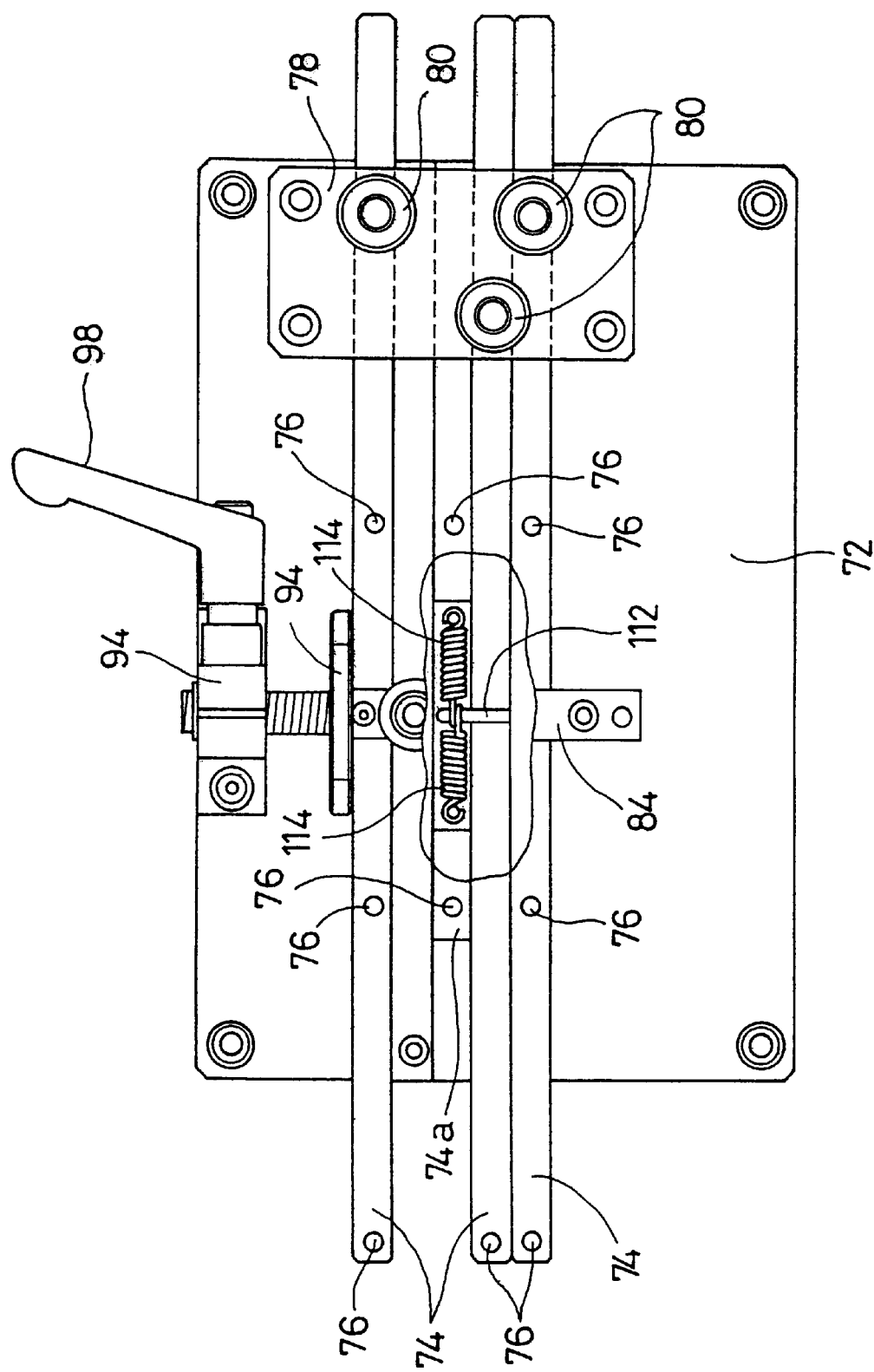
FIG. 8 shows an example of an inner portion of slide members having supporting pins.
Figure 9:
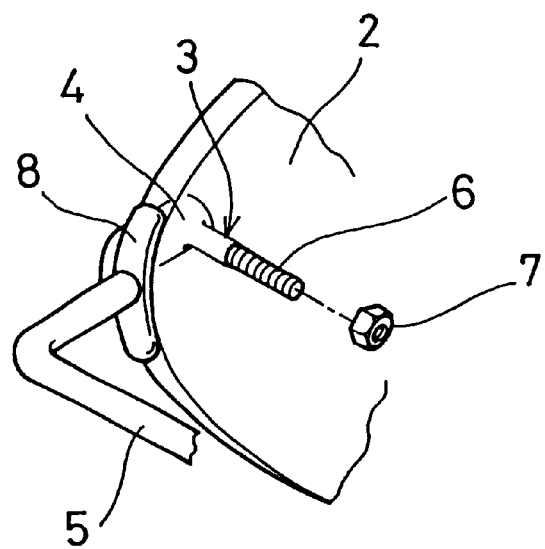
FIG. 9 is a perspective view showing main parts of a conventional pair of eyeglasses.

As shown in FIG. 8, one slide member 74a may be connected with the adjacent slide member 74 via springs at the inside portions thereof. That is, a pin 112 is arranged to extend from the slide member 74 to the slide member 74a at the inside portion thereof, and the springs 114 are installed between the pin 112 and the slide member 74a.

In fixing the sample lens 130, the slide members 74 and 74a are moved to bring the supporting pin 76 into contact with the edge of the sample lens 130. In this state, the slide member 74 is fixed by screwing the locking screw 80. When the position of the sample lens 130 is determined in such a manner, the slide member 74a can be moved, and can be returned to the determined position by the spring 114. Thus, it is easy to remove the sample lens 130, and to place the lens 12 at the position where the sample lens 130 has been placed.

The through-holes 14, 16 are formed in the lens 12 at positions corresponding to the positions of the through-holes 132 of the sample lens 130. Therefore, the distance between the inner side of the supporting piece 30 and the columnar member 26 is equal to the distance between first end of the lens 12 and the through-hole 14 and to the distance between the second end of the lens 12 and the through-hole 16. Further, because the inner diameter of each of the through-holes 14, 16 formed by the drill 60 is substantially equal to the outer diameter of the columnar member 26, it is possible to prevent the columnar member 26 from being loosened inside of the through-holes 14, 16.

The columnar member 26 is tightly fitted into the through-holes 14, 16, and the end portion of the lens 12 is sandwiched between the columnar member 26 and the supporting piece 30 without a gap. Therefore, the temple 18 and the bridge 42 are not loosened by inserting the fastener 32 into the through-holes 14, 16 to engage the fastener 32 with the columnar member 26. Consequently, the fastener 32 is not easily loosened and the number of times of tightening the fastener 32 can be reduced. Further, because the flexible washer 40 is interposed between the head part 34 of the fastener 32 and the lens 12, it is possible to prevent the fastener 32 from being loosened because of the elastic force of the washer 40. The gap is formed between the male screw part 36 of the fastener 32 and the inner wall of the through-holes 14, 16. Thus, as shown in FIG. 3, the washer 40 penetrates into the gap, thus using its elastic force efficiently. Consequently, it is possible to prevent the fastener 32 from loosening because of the cooperation of the flexible washer 40 and the gap. Because the gap is formed between the male screw part 36 of the fastener 32 and the inner wall of the through-holes 14, 16, the gap absorbs a distortion generated on the lens 12 by an external force applied to the eyeglasses 10, thus preventing the lens 12 from being broken.

According to preferred embodiments of the present invention, it is possible to accurately form a through-hole on a lens at a predetermined position thereof. Thus, it is possible to prevent a lens and a temple as well as a bridge from loosening relative to each other. Further, the fastener 32 is not easily loosened and the number of times of tightening the fastener can be reduced. A sample lens is utilized to accurately form the through-hole on the lens at the predetermined position thereof. Therefore, even an unskilled person can easily form the through-hole.

It will be apparent from the foregoing that, while the invention has been described in detail and illustrated, there are only particular illustrations and examples and the invention is not limited to these, the spirit and scope of the invention is limited only by the appended claims.

What is claimed is:

1. A pair of eyeglasses comprising:

a lens;

a through-hole formed in the vicinity of an edge of said lens;

a connection member having a columnar member inserted into said through-hole from a first surface side of said lens and a supporting piece formed along said edge of said lens and used to connect said lens to a temple or to a bridge; and a fastener inserted into said through-hole from a second surface side of said lens and fixed to said columnar member;

wherein an inner diameter of said through-hole is substantially equal to an outer diameter of said columnar member; and a distance between an inner side of said supporting piece and said columnar member is substantially equal to a distance between said edge of said lens and said through-hole.

2. The eyeglasses according to claim 1, wherein said fastener includes a male screw part and said columnar member includes a female screw part, and said fastener is fixed to said columnar member via the male screw part provided on said fastener that is threadedly engaged with the female screw part provided on said columnar member.

3. The eyeglasses according to claim 2, wherein the length of said columnar member is shorter than that of said through-hole; and a gap is formed between said male part of said fastener and an inner wall of said through-hole.

4. The eyeglasses according to claim 3, wherein the fastener includes a head part and a flexible washer is interposed between said lens and the head part of said fastener.

5. The eyeglasses according to claim 2, wherein the fastener includes a head part and a flexible washer is interposed between said lens and the head part of said fastener.

* * * * *